Figure 1:
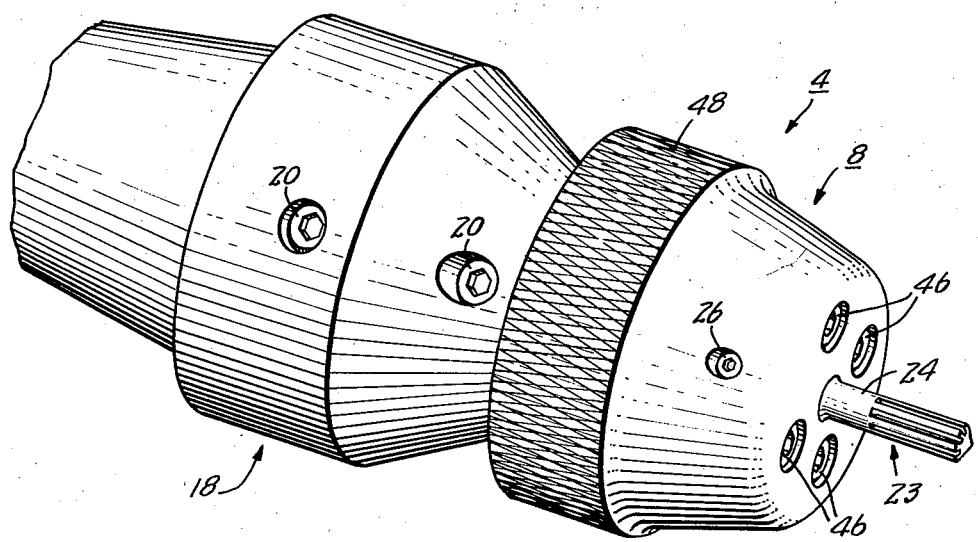

March 25, 1958  R. MacFARLANE  2,828,132
CONCENTRICITY CONTROL APPARATUS
Filed Dec. 22, 1954

HARDENED TOOL STEEL INSERTS WITH SPECIALLY GROUND AND LAPPED SURFACES 34

INVENTOR
ROBERT MAC FARLANE
BY
Curtis, Morris & Safford
ATTORNEYS

2,828,132
CONCENTRICITY CONTROL APPARATUS

Robert MacFarlane, Stamford, Conn., assignor of one-fifth to G. Kendall Parmelee, Hawthorne, N. Y.

Application December 22, 1954, Serial No. 477,049

16 Claims. (Cl. 279—16)

The present invention is in the field of machine tools and relates particularly to a concentricity control adaptor for use with any one of the various types of chucking media and with tools which cut or operate by relative rotation between the tool and the work piece which is being machined. The concentricity control adaptor described herein enables quick, easy, accurate adjustment of the tool into truly concentric relationship with respect to the desired center line of relative rotation.

With the concentricity control adaptor described herein a machinist of average skill, using it for the first time, can bring a tool into truly concentric relation from an error of five thousandths of an inch in less than three minutes. After two or three tries, he can usually reach a dead center position in less than two minutes. This is a real advance in the art and a tremendous boon to a machinist.

In the machine tool field, there has been a long-felt need for an easy, accurate, rugged, practical concentricity control adaptor, as is provided by the present invention. In recent years the need for such an adaptor has become even more pressing, for it is becoming quite common to specify dimensional tolerances for machining operations in terms of ten thousandths of an inch. The continued advances occurring in technology in various fields have resulted in increased speeds and power, and in many cases in decreased size and weight, so that the machinist is being called upon to manufacture pieces to ever higher degrees of precision.

In order to illustrate the importance of the concentric operation of a cutting tool, consider the problems faced by a machinist prior to the present invention in using an end milling cutter in a vertical milling machine to cut a slot in a work piece. Assume that the required dimensions of such a slot are specified to an accuracy of one ten thousandth of an inch. To make the slot with one cut, he would like to use a milling cutter having a diameter equal to the desired width of the slot. With typical milling machines of this type, even the newest and most precise ones, it is not uncommon to find that the machine spindle actually runs out of true concentric relationship by something in the neighborhood of one thousandth of an inch. In many cases, even with very high quality bearings, the error is more nearly two thousandths. A tool chucked in a high quality drill chuck is usually off center by about three thousandths of an inch. Into the machine spindle is inserted the customary fixed tool adaptor, and the milling cutter is then usually locked into the free end of the fixed adaptor by means of set screws. Usually the adaptor and cutting tool add further eccentricity to that of the machine spindle, so that the cutting tool itself runs out of concentric relationship by at least two thousandths of an inch. With older or worn parts the eccentric problems may be much more severe.

This two thousandths or more variation in radius amounts to a total of at least four thousandths of an inch on the diameter; or, in other words, the machinist is faced with a cutting tool which is running in such a way that it will inherently cut the slot as much as forty ten-thousandths of an inch over-size. Faced with this problem, the machinist may loosen the adaptor and loosen the cutting tool in the adaptor and turn them into various different angular positions with respect to the machine spindle in an effort to minimize the eccentric motion of the cutting tool. In this attempt to attain a truly concentric operation, the machinist may spend considerable time, and often this repositioning of the tool and adaptor is unsuccessful. The final step is to find a different milling cutter which is under size or to grind the tool being used so that it is under size by the desired amount. Before the machinist is actually ready to cut the slot several hours may be used merely in overcoming the eccentricity problem. An alternative arrangement is to use a milling cutter much smaller than the desired width of the slot and to cut the slot in two operations, running down one side and then back up the other. This requires the machine to be set up for two separate cutting operations, each of which takes considerable time, but may often be more economical in total time.

These eccentricity problems are present in all types of machining operations wherein the cutting occurs by relative rotation between the tool and work piece. For example, consider the problem of drilling and reaming a hole. The skilled machinist, when required to drill and ream a hole in a piece which is to be finished to a thickness of one inch, may often start with a piece of stock which is one and a quarter or one and three eighths inches thick. The reason is that the drill and reamer, as each starts into the work piece, is rotating in eccentric fashion and makes the first part of the hole over size. As each progresses, the work piece itself begins to guide the drill or reamer into a more concentric path, with the eccentric motion of the machine spindle and chuck being absorbed by the flexibility of the shank of the drill or reamer. The work piece is then finished to size by cutting away the extra material on the face of the work piece into which the drill and reamer were advanced.

There are numerous tricks of this sort which are accepted standards for the skilled machinist to use in combatting the eccentricity problems he continuously encounters, requiring extra time, extra cutting operations, extra material.

The solution to the eccentricity problem does not lie in making the machine tools more precise, although, of course, this is helpful, because eccentricity is a cumulative problem. Even if the machine spindle were running perfectly concentric, by the time the machinist has inserted an adaptor and tool, or otherwise chucked up the tool, a degree of eccentricity has been introduced. For small size tools it is common to use one sleeve projecting from the adaptor for holding the tool, two sleeves in addition to the fixed adaptor are used on occasion to accommodate very small tools.

Among the advantages of the concentricity control adaptor described herein are those resulting from the fact that it enables the machinist to adjust the tool into concentric relationship, compensating for all eccentricity wherever it occurs, whether it is in the machine spindle, in the tool holding medium, or even in the shank of the tool itself.

Besides causing difficulty in obtaining desired dimensional accuracy, a cutting tool which is running with an eccentric motion actually operates as a fly-cutter and only cuts on the one or two teeth which happen to be on the "high side" of the cutting tool with respect to its relative rotation. The result is that these particular teeth on the tool do all the work and quickly dull, and considerable noise, shock, and vibration occur during the cutting.

Then the quality of the cut deteriorates. The life of the milling cutter is sharply reduced. In cutting the slot, as described above, whether in one or two passes, if the machinist did not obtain concentric motion of the cutter, and usually he cannot, at most only a few teeth on the cutter do the cutting.

With the tool adjusted into truly concentric operation as is easily obtained by the concentricity control adaptor described herein, the cutting is evenly shared among all of the teeth of the tool. The tool operates surprisingly smoothly. Its speed can be greatly increased, and the quality of the cut is increased. The life of the tool is multiplied many times even at the higher speeds which are made possible.

Among the many other advantages of the concentricity control adaptor described herein are those resulting from the fact that it is not complex, is easy to adjust, positively holds its adjusted position, is light in weight, and is well suited for use with a wide variety of different types of spindles, chucks, adaptors, and other chucking media and tool-holding devices.

There have been prior devices suggested for making eccentric adjustments of a tool. However, these prior devices have depended upon bowed leaf springs, or other tension springs, to maintain a desired frictional effect with the adjustable member and have used radial adjusting screws or eccentric camming action in making adjustments. Such prior devices are complex and are not practical in operation, for the various elements which are included to provide the radial adjustment in fact tend to throw the parts out of axial alignment. Radial screw adjustments tend to be limited in accuracy to the accuracy of the plane in which they are positioned and require very exacting lay-out to make opposing screws truly diametrically opposite. Imperfections in the screws and threaded holes further limit accuracy. The result of the use of radial screw adjustment is usually a twisting action creating an error in the axial plane. Adjustments by such radial screws require considerable time, and even when well done would provide only a limited improvement. Springs cause variable errors and create inaccuracies by canting of the parts during adjustment.

The adaptor described herein has specially ground and lapped surfaces between its radially adjustable nose piece and its shank portion. These special surfaces are precisely perpendicular to the desired axis of relative rotation. These surfaces produce an adhesive effect at an interface between each other so that when the clamping screws are loosened, the nose piece is held in position, regardless of its attitude (i. e., it "hangs up"). Also, when the nose piece is moved to a new radial position, the special surfaces still serve to hold it in this new position. Thus, it is easily adjusted and holds adjustment. Moreover, when the clamping screws are tightened, these special surfaces engage and lock with each other to form, in effect, an integral tool holder which is rugged in operation and well adapted for high speed operation.

This concentricity control adaptor is very practical and extremely accurate. No screw elements, springs or cams are used by the machinist to make the radial adjustments, and thus he can obtain and hold an infinite range of adjustments. The machinist is aided by the action of the special surfaces at their interface, for they permit the radial adjustment to be made simply by gently tapping the nose piece with a suitable babbit or plastic hammer. These surfaces provide a smooth damped precisely radial adjustment without any overtravel of the nose piece.

In effect, these specially ground and lapped surfaces at their interface provide a number of important simultaneous effects, such as: (1) they continuously hold the nose piece in whatever radial position to which it is adjusted while the clamping screws are loose; (2) they enable the nose piece to be adjusted radially by applying gentle taps with a hammer; (3) they enable the nose piece to be adjusted into an infinite number of radial positions; (4) they maintain the plane of adjustment truly perpendicular to the axis of rotation; (5) they prevent the nose piece from becoming canted either during adjustment or after clamping; (6) they do not shift in position as the clamping screws are tightened, so that the adjusted position is not lost during tightening; and (7) after the clamping force is applied, these surfaces grip each other with tremendous force, as if made of a solid piece.

Figure 2:
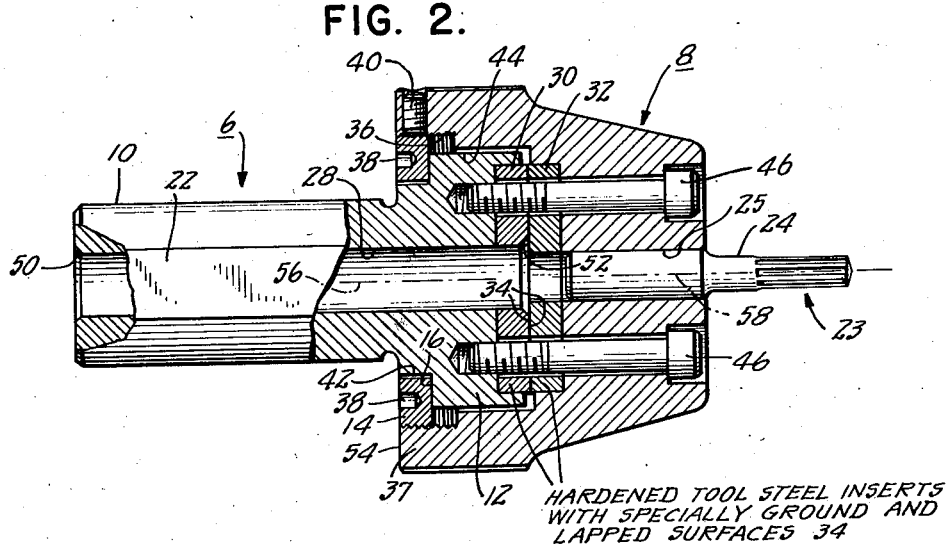

The various aspects, features, and advantages of the present invention will be more clearly understood from a consideration of the following description in conjunction with the accompanying sheet of drawings, in which:

Figure 1 is a perspective view of the concentricity control adaptor to show a typical arrangement of it; and Figure 2 is a longitudinal sectional view taken along the axis of the adaptor, and showing the arrangement of the various parts.

The concentricity control adaptor generally indicated at 4, includes a base portion 6 adapted to be held in a suitable machine part, and a radially adjustable tool-holding portion 8. The base portion 6 is shown here as a shank 10 with a flange 12 on one end, and the tool-holding portion 8 is a nose piece held onto the flange 12 by means of a bezel ring 14 engaging an annular shoulder 16 on the back of the flange 12.

In operation, the shank 10 is inserted into a tool adaptor 18, as shown partially in Figure 1, and is locked in place by means of two set screws 20 engaging a flat face 22 on the shank 10. The adaptor 18 is the customary tool adaptor adapted to be held in a rotating machine part, for example, such as the rotating spindle of a vertical or horizontal milling machine or, alternatively, the shank 10 may be gripped in a suitable chuck of a lathe or drill press or other type of chucking medium.

The cutting tool, shown here as a small end mill 23 has its shank 24 held in the bore 25 of the nose piece 8 by means of a set screw 26.

The shank 10 has a bore 28 passing therethrough and aligned with the bore 25 so that if the cutter 23 should become stuck in the bore 25, a rod can be inserted through the shank bore 28 to loosen the cutter by tapping it.

In order to permit radial adjustment of the nose piece 8 with respect to the axis of the shank base portion 6, a pair of specially ground and lapped hardened tool steel inserts 30 and 32 are provided in the front end of the shank portion and in the nose piece, respectively. These inserts engage each other along an interface 34 which is precisely perpendicular to the axis of the shank 10. The generation of the engaging surfaces of the inserts 30 and 32, which form the interface 34, is described in detail below, and is extremely important in obtaining the proper precise and easy operation of the concentricity control adaptor.

The bezel ring 14 is annular and is threaded on its outer surface so as to screw into a threaded recess 36 formed in a rearwardly extending annular lip 37 on the rear of the nose piece 8. A number of sockets 38 are provided at spaced points on the exposed rear face of the bezel ring so that a spanner wrench can engage the bezel ring to tighten it into place. I have found it desirable to tighten the bezel ring until between .001 and .004 inch of axial play exists between the front face of the bezel ring and the shoulder 16. I have found that .002 inch is usually a very satisfactory adjustment. After this axial clearance has been adjusted, the bezel ring is clamped in place by a set screw 40.

In order to permit a range of radial adjustment, a radial clearance of about .005 inch is allowed all around between the inner face of the bezel ring and the surface 42 adjacent the shoulder 16. A corresponding clearance of .005 inch is provided all around between the outer surface 44 of the flange 12 and the inside of the nose piece 8. The nose piece is clamped into adjusted position by means of four clamping screws 46 inserted through four holes in nose piece 8 with .010 inch clearance all around the shanks of these screws, and screwed into the flange 12 by a thread of a pitch of 24 turns per inch.

In operation, the machinist puts the shank 10 in place and locks it with the set screws 20 or other suitable chucking medium, loosens the screws 44 more than the amount of axial clearance provided at the bezel ring (in practice this is one-quarter of a turn), and slowly rotates the machine part 18 and the adaptor 4 while a dial indicator is held against the shank 24 of the cutter near the base of the teeth. The interface adhesion holds the insert 32 against the insert 30 in spite of the axial clearance. The machinist notes the "high spot" of the shank 24, and gently taps the knurled rim 48 of the nose piece so as to move the cutter 23 toward concentricity. After each tap the machinist rotates the shank 24 to check the progress of the adjustment. The interface 34 holds each adjusted position, in effect clamping the tool-holding portion 8 to the base portion 6 while enabling their relative radial adjustment.

As soon as the eccentricity has been corrected, the machinist uniformly tightens the clamping screws 46 and again rotates the chucking medium, giving a final check to the concentricity of the shank 24. With this adaptor, after using it once or twice, a machinist can usually bring a cutting tool into concentric relationship in less than two minutes and always in less than three minutes so that it runs true to within a small fraction of one ten-thousandth of an inch.

This adaptor will correct any eccentricity up to a total of five-thousandths of an inch, which is sufficient for most applications, for correction of greater eccentric errors, the radial clearance around the surfaces 42 and 44 is correspondingly increased.

The adaptor 4 may be made entirely of hardened tool steel but, as shown, is made as follows: the shank portion is formed of a light strong alloy shaped by rough turning on a lathe. Then the bore 28 is drilled and counter-sunk at the rear and front ends at 50 and 52. The shoulder 16 is turned as well as the outside diameters at the surfaces 42 and 44. The outside surface and then the bore of the shank is finished. Then the outside of the shank is gripped and the shank is rotated to cut the recess for the insert 30.

The nose piece may be made entirely of hardened tool steel, but it is shown as made from a light-weight strong alloy. The stock is chucked for cleaning up its rear face 54 for a rough machining out of its inside configuration. The bore 24 and the recess for the insert 32 are cut out, and the threaded recess 36 for the bezel ring is cut. Then the outside 48 of the nose piece is knurled. The nose piece 8 is supported by means of the threads 36 while its tapered nose portion is finished off on the outside.

The bezel ring 14 is formed from tubular stock suitably ground to the desired dimension on the inside and with a thread generated on the outside. Then the tube is cut to length and the sockets 38 are drilled. The holes for the clamping screws 46 are drilled and tapped in the shank portion, and drilled and counter-bored in the nose piece. The inserts 30 and 32 are cut to size and heat treated and then inserted into their appropriate recesses.

In order to provide the desired surface at the interface 34, the shank 10 is gripped and the front face of the insert 30 is ground to produce a superior surface, that is, having a finish in the range from about 10 to 20 micro inches. The nose piece 8 is gripped by a rod inserted into the bore 24 and the rear face of the insert 32 is similarly ground.

Each of these ground surfaces is then lapped by means of a suitable lap. For example, I have satisfactorily used a sequence of three lapping operations following grinding for generating the interface 34 between the adjusting surfaces, as follows: A lap of "Meehanite" cast iron having a flat face with keystone shaped serrations therein in a perpendicular grid pattern is used during the first two operations. The face of the lap is held against the ground front face of the adjusting surface of the base insert 30 while the shank 10 is rotated about its axis 56 at 75 to 80 R. P. M. The lap is counter-rotated gradually at only a few R. P. M., preferably pausing intermittently at random positions. A 400-mesh abrasive is used, that is, an abrasive at least of a fineness that will permit its passing through a screen having 400 lines per inch, and this first lapping operation is run for a total period in the range from at least about 15 to about 20 minutes.

Then the same lap is run against the adjusting surface of the nose piece insert 32 while the nose piece is rotated about its axis 58. This second lapping operation is for the same period and with the same size abrasive as for the first step.

Finally, the two adjusting surfaces are brought in face to face contact and are lapped against each other at the same speed for five minutes using an abrasive at least of a fineness to pass 400 mesh screening. Usually I use 600 mesh abrasive to complete the sequence.

An interface 34 generated in this manner is highly satisfactory. The adjusting surfaces at the interface are very precisely planar and very precisely perpendicular to the two respective axes 56 and 58. Thus, when the base 6 and tool-holding portion 8 are in engagement, their respective axes are exactly parallel to each other at all radial positions of the nose piece, which is very important to obtain true concentricity.

The resulting quality of the finish of the adjusting surfaces is in the range from about a 6 to about a 15 micro inch finish.

In certain instances two intermediate lapping operations may be used in which the lap, with 600 mesh abrasive, is run against each insert for about five minutes each following the use of the 400 mesh abrasive. In this case, the length of time of the first two operations may be reduced somewhat.

The resulting quality of the finish of the adjusting surfaces as a result of the increased use of the finer 600 mesh abrasive is in the range from about a 4 to about a 12 micro inch finish.

In general, I have found that the adjusting action of this concentricity adaptor with adjusting surfaces of the size described below is most suitable with a finish in the range from about 6 to about 15 micro inches, it being very important that the surfaces be planar.

In operation, the adjusting surfaces at the interface 34 are coated with a minute amount of high grade fine petroleum jelly, such as "Vaseline," or with a minute amount of suitable high grade lubricant, such as "Lubriplate," which protects the surfaces and increases the adhesion effect so as to provide a positive holding action when the screws 46 are loosened. The inserts have a diameter of 1.75 inches and the bore 28 is 0.5 inch, providing an interface 34 of an area of 2.2 square inches. With a suitable film of a high quality lubricant, that is, a film which is of a thickness in the range from .1 to .6 micro inch thick and preferably in the range from .1 to .3 micro inch thick, and surfaces having a finish in the preferred range, I find that the adhesion therebetween is sufficient to support 60 pounds pulling along the axis 58 even with the four screws 46 and the bezel ring 14 entirely removed. This is a separating force of 27.7 pounds per square inch necessary to overcome the adhesion of these finely lubricated surfaces. I find that the surfaces should be of a quality to require at least 20 pounds per square inch separating force to provide the full effects of the advantageous operating features discussed above. Where heavier tools are used, the adjusting surface area 34 may advantageously be increased in certain instances and the finish should be of a quality to require at least 25 pounds per square inch separating force.

Advantageously as shown the bore 25 in the nose piece is .375" in diameter to accommodate a wide range of sizes of small end milling cutters all having a shank diameter of ⅜" inch. Other sizes for the bore 25 can be used.

The light weight of the adaptor makes it well suited for use at the very high speeds which its true concentricity enable to be used. This is particularly advantageous for the smaller size tools.

From this description it will be understood that the present invention provides a concentricity control adaptor well adapted to give the many advantages described above and which is a real advance in the machine tool field. The adaptor described may be subject to a wide variety of changes or modifications each as may be best suited to particular applications, and the scope of the present invention, as defined by the following claims is intended to include such alterations.

I claim:

1. Concentricity control apparatus comprising a first portion having an axis and including means defining a first lapped planar surface rigidly perpendicular to said axis, a second portion having a second axis and including means defining a second lapped planar surface rigidly perpendicular to said second axis, and releasable clamping means for releasably clamping said first and second surfaces against each other with substantial force and for releasing said surfaces to permit their sliding relative to each other.

2. Concentricity control apparatus comprising a first member having an axis and being adapted to be rotated about said axis and having a first planar surface fixed perpendicular to said axis, said first surface being of a quality better than 20 micro inches, a second member having a second planar surface of a quality better than 20 micro inches and engaging said first surface, said second member having an axis fixed perpendicular to said second surface and being adapted to rotate about said axis, and releasable clamping means for releasably clamping said first and second surfaces firmly against each other and for releasing said surfaces to permit relative movement of said members perpendicular to said axes while maintaining said surfaces in engagement with each other.

3. A radially adjustable tool holder comprising a base portion having a first axis, said base portion including hard material defining a first planar surface rigidly perpendicular to said axis, said surface having a finish of a quality of at least 20 micro inches, a tool-holding portion including a hard material defining a second planar surface bearing on said first surface, said tool-holding portion including tool-holding means adapted to hold a tool in rigid position with respect to said second planar surface, a film of lubricant therebetween of a thickness in the range from about .1 to about .5 micro inch, said second surface having a finish of a quality of at least 20 micro inches, and releasable clamping means for clamping said first and second surfaces against each other, and for releasing said surfaces to permit sliding therebetween in a direction perpendicular to said axis.

4. A concentricity control adaptor for a rotary tool comprising a rotatable base portion having an axis of rotation, said base portion including hard material defining a first planar surface fixedly perpendicular to said first axis, said first surface having a finish of a quality in the range from about 4 to about 15 micro inches, a tool-holding portion having an axis, means on said tool-holding portion for securing a rotary tool fixedly in substantial alignment with its said axis, said tool-holding portion including hard material defining a second planar surface fixedly perpendicular to its said axis, said second surface being in face to face engagement with said first surface, said second surface having a finish of a quality in the range from about 4 to about 15 micro inches, and releasable clamping means for clamping said first and second surfaces against each other with substantial force and for releasing said surfaces to permit their sliding against each other.

5. A concentricity control adaptor for a rotary tool comprising a base portion adapted to be rotated about an axis of rotation, said base portion including hard material defining a first planar surface perpendicular to said axis and in fixed relationship with said axis, said first surface having a finish of a quality in the range from about 4 to about 15 micro inches, a film of lubricant on said surface, a tool-holding portion having an axis, means on said tool-holding portion for securing a rotary tool thereto in fixed position along its said axis, said tool-holding portion including hard material defining a second planar surface perpendicular to its said axis and in fixed relationship with its said axis, said second surface being in face to face contact with the film of lubricant on said first surface, thereby to orient said axis of said tool-holding portion parallel to said axis of said base portion, and releasable clamping means arranged to apply considerable force to said surfaces parallel to said axes to lock said portions together and to release said surfaces for relative sliding motion.

6. A radially adjustable tool holder comprising a base portion having a first axis with a shank extending rearwardly along said axis and forming a mounting for said base portion, means defining a first adjusting surface on said base portion, said surface being planar and being in fixed relationship perpendicular to said axis and having a finish of a quality in the range from about 4 to about 15 micro inches, a tool-holding portion having a second adjusting surface bearing against said first adjusting surface, said second adjusting surface being planar and having a finish of a quality in the range from about 4 to about 15 micro inches, tool-securing means on said tool-holding portion for securing a tool rigidly thereto with the tool axis in fixed relationship perpendicular to said second adjusting surface, one of said adjusting surfaces having a plurality of apertures therein, releasable fastening means extending through said apertures arranged to apply considerable force perpendicular to said surfaces to lock said surfaces in face to face contact, said apertures being larger than said releasable fastening means to permit relative sliding of said surfaces for radial adjustment of the tool-holding portion with respect to the base portion when said releasable fastening means are released.

7. A radially adjustable tool holder as claimed in claim 6 and wherein said shank portion has an axial bore extending therethrough and extending through said first adjusting surface, and said tool-holding portion has a second bore extending therethrough and communicating with said first bore, said tool-securing means being arranged to clamp a shank of a tool rigidly in position in said second bore.

8. A concentricity control adaptor comprising a shank, a flange on one end of said shank, the face of said flange including hard material defining a first planar surface fixedly perpendicular to the axis of said shank and having a finish of a quality in the range from about 6 to about 15 micro inches, a fine film of liquid lubricant on said first surface, a tool-holding portion including a hard material defining a second planar surface engaging the film on said first surface and having a finish of a quality in the range from about 6 to about 15 micro inches, said tool-holding portion having means defining a retaining member closely spaced from the rear of said flange, means on said tool-holding portion for securing a rotary tool with its axis fixedly perpendicular to said second surface, and releasable clamping means for clamping said first and second surfaces against each other with substantial force and for releasing said surfaces to permit their sliding relative to each other.

9. A concentricity control adaptor comprising a base portion having an axis, said base portion having means defining a first hard planar surface in fixed relationship perpendicular to said axis, a tool-holding portion, said tool-holding portion having means defining a second hard planar surface bearing on said first surface, a film of lubricant therebetween, means interconnecting said portions and limiting the extent of relative sliding between said surfaces and the extent of relative separation of said surfaces, a plurality of machine screws uniformly spaced around near the perimeters of said surfaces and interengaging said portions for clamping said surfaces against each other, and means on said tool-holding portion adapted to clamp a tool thereto with its axis substantially perpendicular to said second surface and aligned with the center of said second surface and in fixed relationship therewith, said surfaces having a finish of a quality producing an adhesive force of at least 20 pounds per square inch.

10. A concentricity control adaptor comprising a base portion having an axis, a hard member in said base portion defining a planar surface rigidly perpendicular to said axis, a tool-holding portion, a hard member in said tool-holding portion defining a planar surface bearing on said first surface, means between said portions limiting the extent of relative sliding motion of said second member with respect to said first member, confining means limiting the extent of separation of said first member from said second member, means on said tool-holding portion for securing the shank of a tool thereto with its axis perpendicular to the surface of said second member, and means for releasably clamping said members together, said surfaces having a finish of a quality requiring a perpendicular force of at least 20 pounds per square inch to separate them when lubricated with a fine film of lubricant.

11. A concentricity control adaptor comprising a rotatable shank, a round flange on the end of said shank, said flange including hard material defining a first planar surface rigidly perpendicular to the axis of said shank, said surface having a finish of a quality of at least 15 micro inches, a nose portion having an annular lip surrounding said flange with a slight clearance all around to enable radial adjustment of said nose portion with respect to said flange, said nose portion having hard material defining a second planar surface bearing against said first surface and having a finish of similar quality, a film of lubricant between said surfaces, and means for releasably clamping said surfaces together.

12. A concentricity control adaptor as claimed in claim 11 and wherein said flange includes an annular shoulder, and the annular lip of said nose portion is threaded and including a threaded ring screwed onto said lip and overhanging the rear face of said shoulder to support the nose portion on said flange.

13. A concentricity control adaptor as claimed in claim 11 and wherein said clamping means are a plurality of machine screws passing through uniformly spaced holes in said nose portion and screwing into said flange, clearance being provided around the shanks of said screws to permit radial adjustment of the nose portion with respect to the clearance shank.

14. A concentricity control adaptor comprising a rotatable shank, a flange on the front end of said shank, the rear end of said shank being adapted to be secured in a rotatable machine part, said flange including hard material on its front face defining a first planar surface in fixed relationship with said shank and rigidly perpendicular to the axis of said shank and having a finish of a quality in the range from about 6 to about 15 micro inches, a nose portion supported on said flange to enable radial adjustment of said nose portion with respect to said flange and including a rearwardly extending annular lip embracing said flange and spaced therefrom, an internal thread on said annular lip, an annular bezel ring threadedly engaging said lip and overhanging the rear surface of said flange, said nose portion including a hard material defining a second planar surface bearing against said first surface and having a finish of a quality in the range from about 6 to about 15 micro inches, means on said nose portion for securing a tool thereto along the axis of said annular lip, a plurality of uniformly spaced apertures extending rearwardly through said nose portion and through said surfaces into said flange, said apertures being threaded in the flange, and a plurality of machine screws inserted through said apertures and threadedly engaging said flange for releasably clamping said nose portion to said flange.

15. A concentricity control adaptor as claimed in claim 14 and wherein said means for securing a tool to said nose portion is a central bore in said nose portion and a set screw adapted to engage the shank of a tool in fixed position in said bore.

16. A concentricity control adaptor as claimed in claim 14 and wherein the material defining said first and second planar surfaces is provided by hardened tool steel inserts, with the remainder of said adaptor being of light strong alloy material.

References Cited in the file of this patent
UNITED STATES PATENTS

| | | |
|---|---|---|
| 1,222,466 | Railton | Apr. 10, 1917 |
| 2,353,834 | Klute | July 18, 1944 |